March 22, 1960  C. T. HOLZMUELLER, SR  2,929,428
ANTI-SKID DEVICE
Filed Jan. 15, 1959  2 Sheets-Sheet 1

Charles T. Holzmueller, Sr.
INVENTOR.

BY Clarence A. O'Brien
and Harvey B. Jacobson
Attorneys

March 22, 1960  C. T. HOLZMUELLER, SR  2,929,428
ANTI-SKID DEVICE

Filed Jan. 15, 1959                                        2 Sheets-Sheet 2

Charles T. Holzmueller, Sr.
INVENTOR.

BY Clarence A. O'Brien
and Harvey B. Jackson
Attorneys

United States Patent Office 2,929,428
Patented Mar. 22, 1960

2,929,428

ANTI-SKID DEVICE

Charles T. Holzmueller, Sr., Drexel Hill, Pa.

Application January 15, 1959, Serial No. 787,018

1 Claim. (Cl. 152—236)

This invention relates to anti-skid devices for motor vehicle wheels and more particularly to an anti-skid device which is simple in construction and far easier to apply than ordinary skid chains.

An object of the invention is to provide an anti-skid device for a motor vehicle wheel, wherein the wheel rim has a pair of flanges, each identically formed with spaced entrances and slots so that cross-chains having specially designed hooks at their ends may be inserted in the entrance and at least on one side of the rim, engaged in the slot, this being all that is necessary to apply the anti-skid device on the wheel of a motor vehicle.

A further object of the invention is to provide a hook-flange organization wherein one of the hooks is comparatively shallow and the other deep so that the shallow hook is slidable over the flange on one face of the wheel rim and the deep hook has a side which is engageable within a selected slot behind the flange or on the opposite face of the wheel rim. This construction enables the shallow hook to be slipped over one flange and held in place by tension in the cross-chain when the deeper hook is slid along the flange to the point at which the side of the deeper hook engages in the slot. The user of the device, therefore, need not grope around trying to find the slot on the backside of the wheel when applying the anti-skid device. Instead the backside of the wheel has the cross-chain first attached by simply slipping the shallow hook over the flange, and the front side of the wheel which is very easy to work from, has the deeper hook more accurately set by slipping the side of the hook into the slot on the front face of the wheel rim.

A further object of the invention is to provide an anti-skid device for a motor vehicle wheel, wherein the application of the anti-skid device, whether individual cross-chains or full chains, is considerably easier than conventional chains. The invention combines a portion of the rear wheel of a motor vehicle with the cross-chains or full chains fastening means so that the wheel itself is used as an anchorage for the chains, instead of relying on chains in addition to chain tighteners to hold the anti-skid chain fastened to the wheel.

Another object of the invention constitutes a modification of the embodiment described above, and consists essentially of wheel mounted flanges on the front and rear faces of an otherwise conventional wheel, together with spaced entrances and slots and identical hooks for the front and rear faces of the wheel, the hooks being attached to the extremities of cross-chains or full chains and engageable in the slots on both sides of the wheel. Such an organization is not as easily installed on a wheel, but provides the advantage of being securely locked both at the front and the rear by actual inter-engagement of the hooks and their slots.

A further modification of the invention which is contemplated herein, is to have the flange on the inside face of the wheel made continuous, that is without entrances and without or with slots, but have the front face flange provided with entrances and slots. In this way the hook at the inside of the wheel may be engaged over the continuous flange, making it absolutely impossible to separate therefrom in the absence of breaking of the cross-chains, while the outside face of the wheel has the chain hooks easily installed by slipping them through the entrances and then sliding them a short distance circumferentially of the wheel until the inner sides of the hooks drop into the slots. In this modification of the invention, which is well suited for full chains and individual cross-chains, only a few hooks need be applied to the rear face of the wheel and to the front face of the wheel and yet the chains will be held in place very securely.

The nature of a pneumatic tire used on all automobiles, trucks, buses, etc., materially aids in holding the chains in place. The tire has inherent resilience and will yield a very slight amount as the chains are being applied. The nature of the chain, ordinarily made of a plurality of connected links, enables the chains to be slid peripherally short distances in the clockwise or counterclockwise directions, further aiding in the application of the chains to the wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
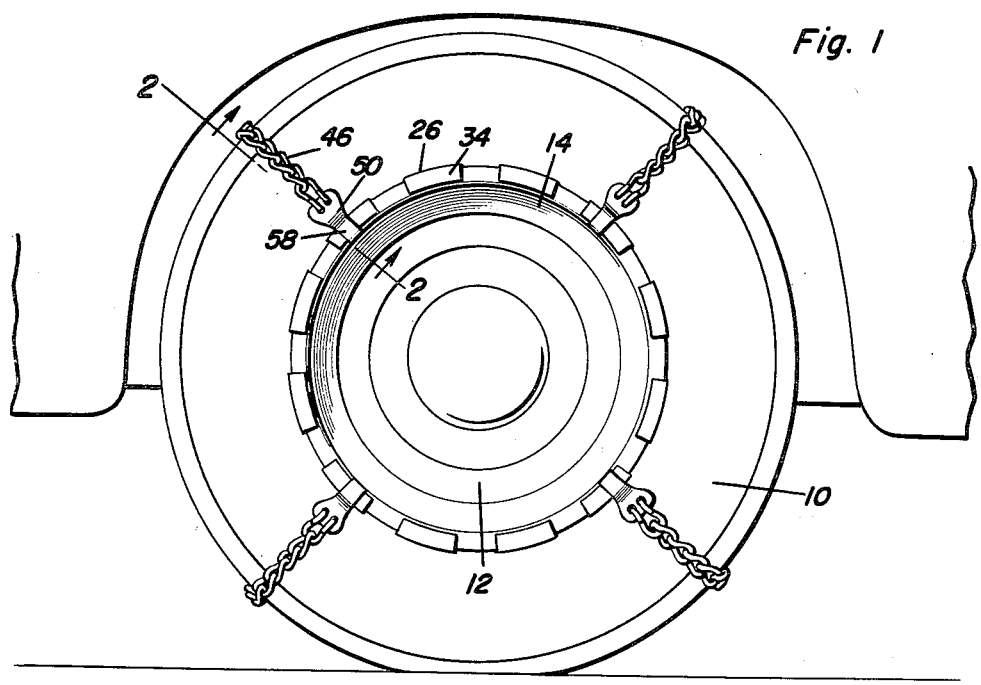
Figure 1 is an elevational view of a wheel equipped with chains in accordance with the invention.
Figure 2:
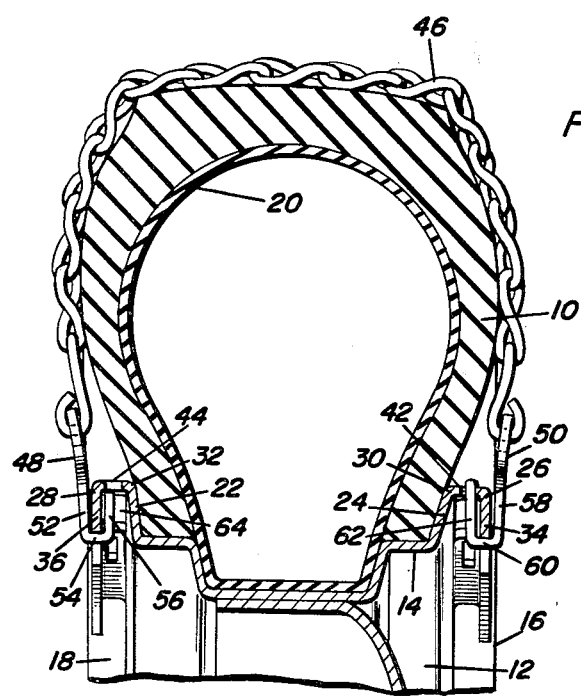
Figure 2 is a cross-sectional view on an enlarged scale and taken on the line 2—2 of Figure 1.
Figure 3:
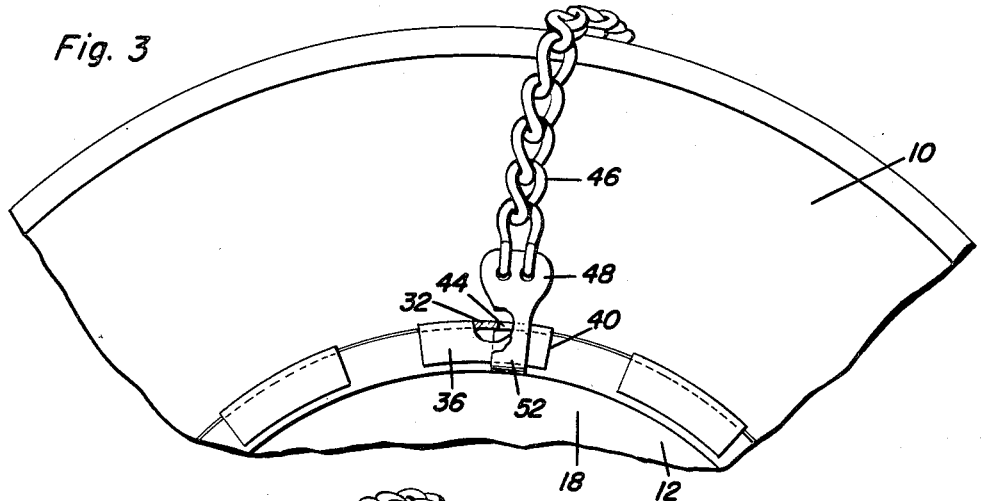
Figure 3 is a fragmentary elevational view of the backside of a tire and wheel fragment having one of the chains thereon.
Figure 4:
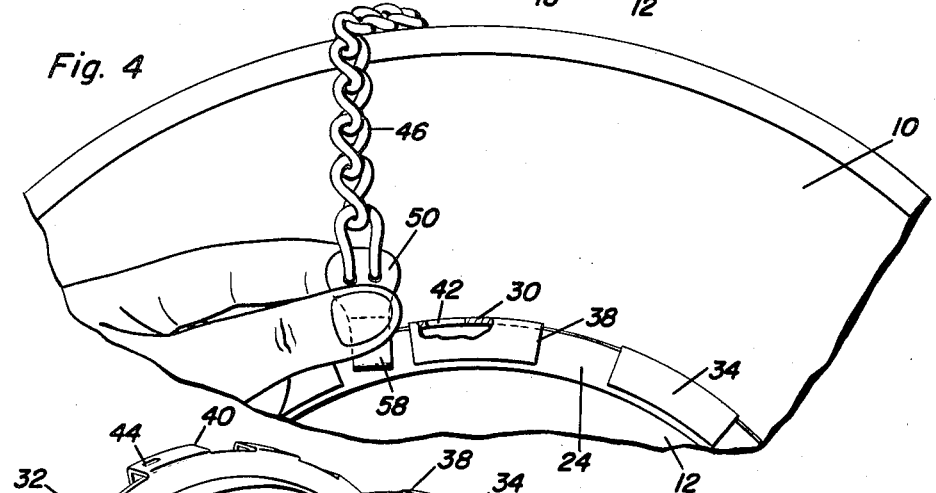
Figure 4 is a view similar to Figure 3 but showing the front side of the wheel.

In the accompanying drawings there is a conventional tire 10 shown on wheel 12. The wheel has a rim 14 with a front face 16 and a rear face 18. Wheel rim 14 receives a tire 10, whether tubeless or with a tube 20, and has sides 22 and 24 against which the bead of the tire bears.

Figure 5:
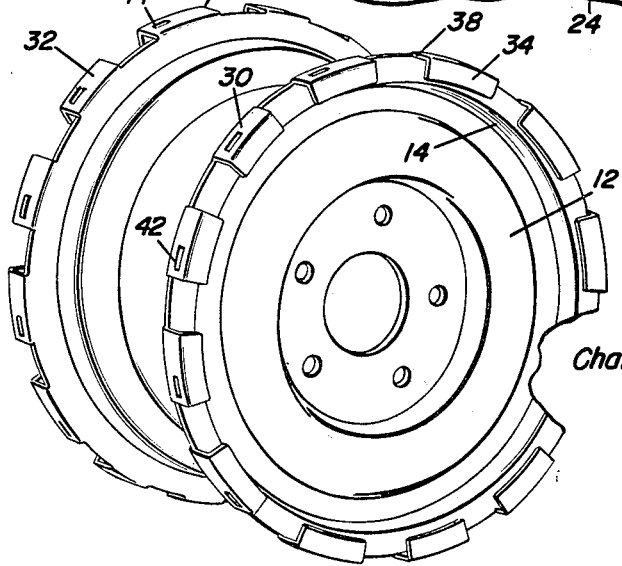
Figure 5 is a perspective view of a wheel constructed with flanges to accept the cross-chains or full chains.

In accordance with the invention flanges 26 and 28 are made integral with the outer edges of sides 24 and 22. Each flange is identical, consisting of a cylindrical portion 30 for flange 26 and a cylindrical portion 32 for flange 28. Right angularly arranged flange sides 34 and 36 are fixed to the outer edges of cylindrical portions 30 and 32. Circumferentially spaced entrances 38 and 40, each consisting of slots, are formed in the flange portions 30, 34 and 32, 36. Circumferentially spaced slots 42 and 44 are in flange portions 30 and 32. Instead of considering the structure added to the wheel rim as flanges having cylindrical portions and circumferential portions, as shown in Figure 5, this structure may be considered as made of a plurality of discrete, spaced L-shaped brackets, sufficiently spaced circumferentially to define entrances 38 and 40. Regardless how considered, though, the structure is the same.

Since the most practical embodiment of the invention entails the use of cross-chains 46, a plurality of cross-chains are illustrated in the drawings. Cross-chain 46 extends transversely across the tire, including the tread and side walls, and has a pair of hooks 48 and 50 at the ends thereof. Hook 48 has a first side 52, a cross member 54 and a second side 56. The hook 50 has an outer side 58, a cross member 60 and an inner side 62. Side 62 is longer than side 56 thereby causing hook 50 to be deeper than the more shallow hook 48.

In use, the hook 48 is first applied to the inside face of the wheel by slipping side 56 through one of the entrances 40 and circumferentially moving the hook a short distance so that it engages in pocket 64 formed by the inner flange and a part of the side 22 of the wheel rim. Then, the hook 50 is engaged with the flange on the outer face of the wheel by slipping side 62 into one of the entrances 38 and sliding the hook circumferentially of the wheel until the extremity of side 62 of hook 50 drops into slot 42. The chain 46 is under tension all during this procedure by fitting reasonably tight against the outer surface of the tire.

When a full chain is used, the only difference will be that the extremities of the cross-chains are connected by a closed loop on the inside and on the outside faces of the wheel.

As indicated previously the invention is susceptible to numerous modifications, one being where the hook 48 is as deep as the hook 50. In the illustrated modification the hook 48 is shallow enough so that the extremity of side 50 does not bear against the surface of cylindrical portion 32. Instead, the inner surface of cross-member 54 frictionally engages the inner periphery of flange 36. Where both hooks are made deep instead of shallow, though, the inner side of each hook will penetrate slots 42 and 44.

Another contemplated embodiment of the invention is to omit entrances 40 and slots 44 on the inner face of the wheel. The shallow hooks, then, may simply be engaged over flange 36, while the hooks 50 on the outer face of the wheel are engaged in slots 42 thereby locking the cross-chains or full chains firmly in place on the wheel. Other modifications contemplated within the scope of the following claim may be resorted to without departing from the protection thereof.

What is claimed as new is as follows:

Anti-skid means for a wheel having a tire retaining rim provided with opposite outturned side rim flanges, said means comprising a plurality of external edge flanges on said rim flanges respectively, of substantially right angled cross-section and spaced apart equidistantly circumferentially of said rim flanges, said external edge flanges comprising respectively, a circumferential portion extending laterally from the rim flange and integral therewith and provided with a slot therein, and an outer flat side portion extending from the circumferential portion toward the axis of the rim and anti-skid cross chains having terminal hooks thereon movable through the space between selected adjacent external edge flanges on the opposite rim flanges and into sliding straddling engagement with the outer side portions of a pair of the selected external edge flanges on the opposite rim flanges, at least one of said hooks having a straight side portion engageable in the slot in the circumferential portion of the external edge flange the side portion of which is straddled by said hook.

References Cited in the file of this patent

UNITED STATES PATENTS

| | | |
|---|---|---|
| 1,292,526 | Silberman | Jan. 28, 1919 |
| 2,631,637 | Purdy | Mar. 17, 1953 |
| 2,664,133 | Eger | Dec. 29, 1953 |